Patented Sept. 15, 1931

1,823,440

UNITED STATES PATENT OFFICE

MELVIN DE GROOTE, OF ST. LOUIS, AND LOUIS T. MONSON, OF MAPLEWOOD, MISSOURI, ASSIGNORS, BY MESNE ASSIGNMENTS, TO TRETOLITE COMPANY, OF WEBSTER GROVES, MISSOURI, A CORPORATION OF MISSOURI

FLOODING PROCESS FOR RECOVERING FIXED OIL FROM SUBTERRANEAN OIL BEARING STRATA

No Drawing.   Application filed March 3, 1930.   Serial No. 432,972.

This invention relates to the recovery of oil from subterranean oil sands and other oil-bearing strata, and has for its main object to provide a practicable, inexpensive process for recovering oil that is held by adsorption on subterranean oil sands, such, for example, as the sands of exhausted oil fields, or the sands of oil fields that have been tested and abandoned, because they did not contain a sufficient quantity of oil to make it commercially feasible to attempt to recover the oil by conventional oil-producing methods.

Briefly described, our process consists in introducing an aqueous treating solution containing wood sulfite liquor into a number of oil wells that have ceased to be productive, and permitting said treating solution to travel through the oil sand and rise through a predetermined opening, the treating solution operating to liberate the film or coating of oil on the particles of sand, and to flush the oil off the particles of sand and carry the oil upwardly to the surface of the ground.

Oil exists in oil sands in two different states, i. e., as "free oil", that is located in the voids between the particles of sand, and as "fixed oil", which is held by adsorption on the particles of sand, and which is commonly referred to as a film of oil that adheres to the particles of sand. Free oil can be recovered by the conventional methods of producing oil, such as draining the oil in conjunction with liquid or gaseous pressure, or creating an artificial fluid or gaseous pressure in the sand bed, so as to dislodge and expel the oil from the sand bed into the well, and then conduct the oil to the surface of the ground by any suitable means or method. Fixed oil, i. e., the coating or film of oil on the sand, cannot be recovered by any of the conventional methods used to produce oil, because it is held as a film surrounding the grains of sand and cannot be dislodged from the sand grains either by fluid or gaseous pressure.

We have discovered that "fixed oil", i. e., oil that is held in the form of a film by adsorption on subterranean oil sands and other oil-bearing strata, can be recovered at a sufficiently low cost to make the operation commercially feasible, if the oil sand with its encasement of oil is washed with an aqueous treating solution that contains or comprises wood sulfite liquor. The same procedure that is used in the ordinary flooding process for reworking abandoned oil fields can be employed to bring the treating solution into contact with the sand, due to the fact that the treating solution is of such a nature or character that it will flush the film of oil off the sand. The liberated oil, after passing through the sand bed, can be conducted to the surface of the ground or recovered by any suitable or conventional method used to produce oil.

Wood sulfite liquor, suitable for use in our process, is easy to obtain and can be produced or obtained at a relatively low cost. One available source of supply for such substances or materials is the liquor that is obtained as a waste product in the manufacture of paper stock by the sulfite process, which sulfite process, as is well known, consists of cooking wood chips under pressure in a digester with bisulfite liquor or bisulfite acid. This bisulfite liquor or bisulfite acid is obtained by the oxidation of sulfur and subsequent reaction with milk of lime prepared from a limestone, preferably calcium-magnesium limestone. The said cooking operation produces a mixture of wood pulp and an acid wood sulfite liquor. Subsequently, said mixture is subjected to treatment so as to separate and recover the wood pulp from the wood sulfite liquor. Another example of wood sulfite liquor or liquor extract, suitable for use in our process, can be produced or obtained as the direct product or principal product of a process consisting of cooking inferior woods not suitable or practicable for use in the manufacture of paper stock with bisulfite liquor or bisulfite acid of the kind mentioned, and then recovering the wood sulfite liquor from the unsuitable wood pulp which constitutes the waste product of the process, the cooking operation being carried on under pressure in a digester or other suitable apparatus.

The state, form, or condition of the wood sulfite liquor at the time it is mixed with water so as to produce an aqueous treating solution suitable for use in our process, is immaterial. Said wood sulfite liquor may be used in its natural state, as it comes from the digester, i. e., in a more or less dilute acid state; but we prefer to neutralize it prior to use in our process, so that the oil recovered by the process will not have a destructive corrosive action on the pipe lines, tank cars, or storage tanks in which said oil is subsequently confined. One simple and efficient method of accomplishing the neutralization of the wood sulfite liquor is to treat it with caustic soda, caustic potash, ammonium hydroxide, megnesium oxide, calcium oxide, calcium carbonate, or any other suitable oxide, hydroxide, or carbonate, of any alkali-forming metal.

In order to reduce the expense of transporting the wood sulfite liquor to the point where it is to be used to recover oil from subterranean oil sands or other oil-bearing strata, said liquor may be concentrated, for example, to a specific gravity of approximately 30° to 32° Baumé. It may even be desiccated further, in which case it becomes a brown powder. As herein used, the term "wood sulfite liquor" is intended to mean essentially the solid active material and not to include the inactive water, which is a diluent or vehicle only. However, we wish it to be understood that by the term above quoted we intend to include the concentrated liquor, and even the anhydrous solid, and also the unneutralized material and the product or material obtained by neutralizing the acid material with the conventional bases, such as calicum oxide or magnesium oxide, as well as soda, potash and ammonia.

One specific example of wood sulfite liquor or extract suitable for use in our process, is a substance having approximately the following composition:

| | |
|---|---|
| Specific gravity | 30.2° Baumé |
| Ash | 6.59% |
| Iron | .034% |
| Lime (CaO) | 1.32% |
| Magnesia (MgO) | 1.54% |
| Solids | 51.03% |
| Soluble solids | 51.03% |
| Non-tannin | 28.80% |
| Tannin | 22.23% |
| Tannin purity | 43.54% |

Such material may be used in any convenient strength, dissolved in any kind of water in which it will make a solution substantially free from precipitates. It has the desirable characteristic of being capable of dissolving in hard or salty water, or in hard salty water almost as readily as in soft or distilled water, and without undue precepitation.

Our broad idea contemplates the use of wood sulfite liquor, as herein defined, in any condition or state. Said wood sulfite liquor may be used alone, or it may be used with other substances known to have similar powers, such, for example, as propylated naphthalene sulfonic acid and its salts.

One highly desirable characteristic of an aqueous treating solution containing wood sulfite liquor, which permits it to be used both on Pennsylvania oils and on oils asphaltic in nature, is that the products of the reaction between the reagent and hard water are usually water-soluble, and therefore, there is no possibility of a precipitate being formed that will clog the oil sand and obstruct or impede the flow of the wash water and the oil liberated from the particles of sand by the action of the reagent of the treating solution.

The principal advantages of our process are that it will not clog the oil sand on which the process is employed; it will effect the recovery from abandoned sand beds of oil that contains appreciable quantities of asphaltic or similar material; and the process is inexpensive to practise to carry out, since wood sulfite liquor is commonly obtained as a by-product.

In practising our process, we prefer to use a ratio of about 1 barrel of treating agent on the anhydrous basis to 1,000 barrels of flushing water, but in some instances a ratio of 1 to 20,000, or even 1 to 40,000 may be used. The amount of solution employed may be equal to the amount of recovered oil, or it may be many times greater. The water may be cold or preheated, if desired. The actual mechanical practice is well known and we prefer to use the same apparatus that has been used in the Pennsylvania oil fields to practise the flooding process, or any modifications or variations of such an apparatus.

Having thus described our invention, what we claim as new and desire to secure by Letters Patent is:

1. A flooding process for recovering fixed oil from subterranean oil sands and other oil-bearing strata, which consists in washing the sand or stratum with an aqueous treating solution containing wood sulfite liquor.

2. A flooding process for recovering fixed oil from subterranean oil sands and other oil-bearing strata, which consists in washing the sand or stratum with an aqueous treating solution containing wood sulfite liquor in which the metallic base is derived from an alkali-forming metal.

3. A flooding process for recovering fixed oil from subterranean oil sands and other oil-bearing strata, which consists in washing the sand or stratum with an aqueous treating solution containing wood sulfite liquor obtained by neutralization with a basic calcium compound.

MELVIN DE GROOTE.
LOUIS T. MONSON.